S. E. HORNE AND E. AND A. LUCAS.
AUTOMOBILE FENDER.
APPLICATION FILED OCT. 11, 1920.
1,363,738.
Patented Dec. 28, 1920.
3 SHEETS—SHEET 1.
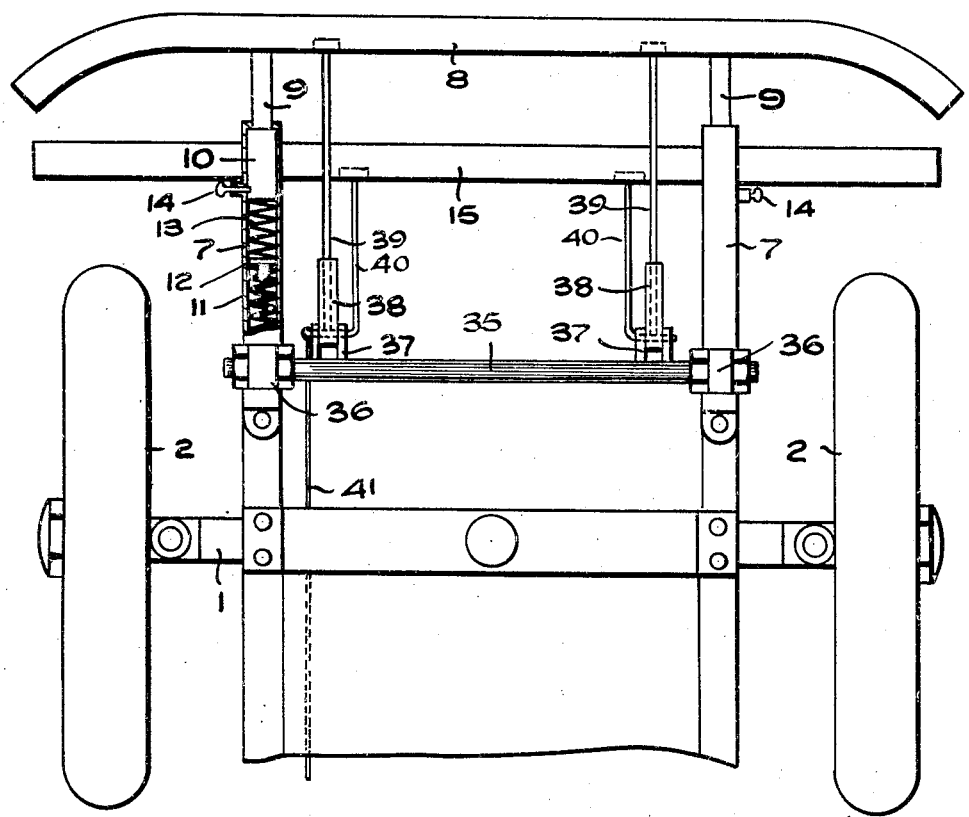
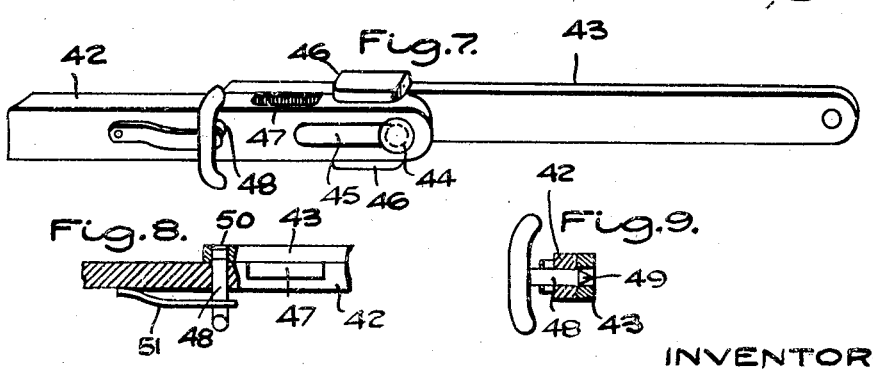
INVENTORS.
S.E. Horne.
E. Lucas.
A. Lucas.

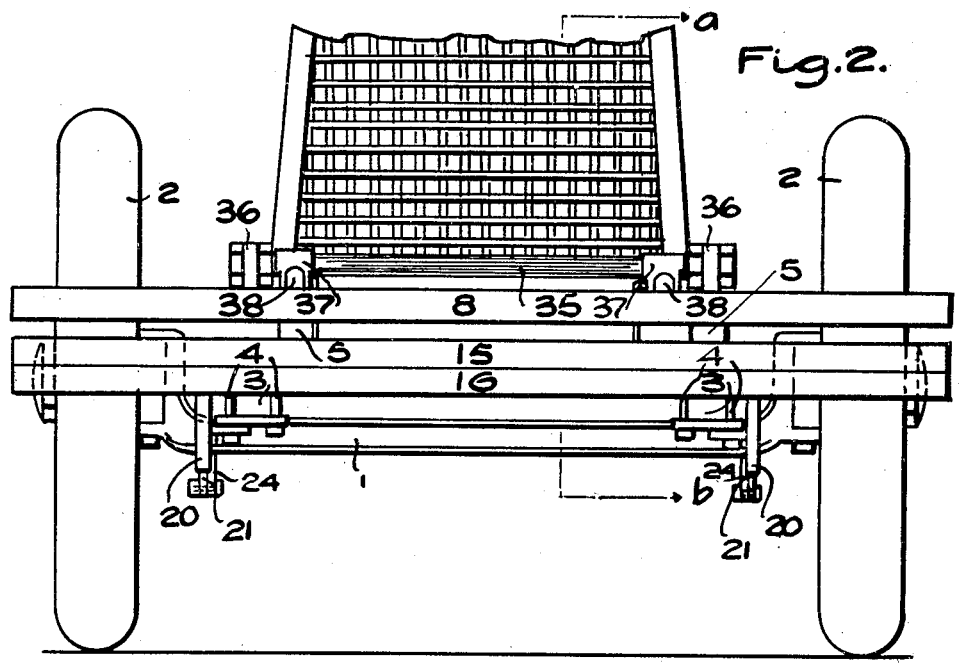
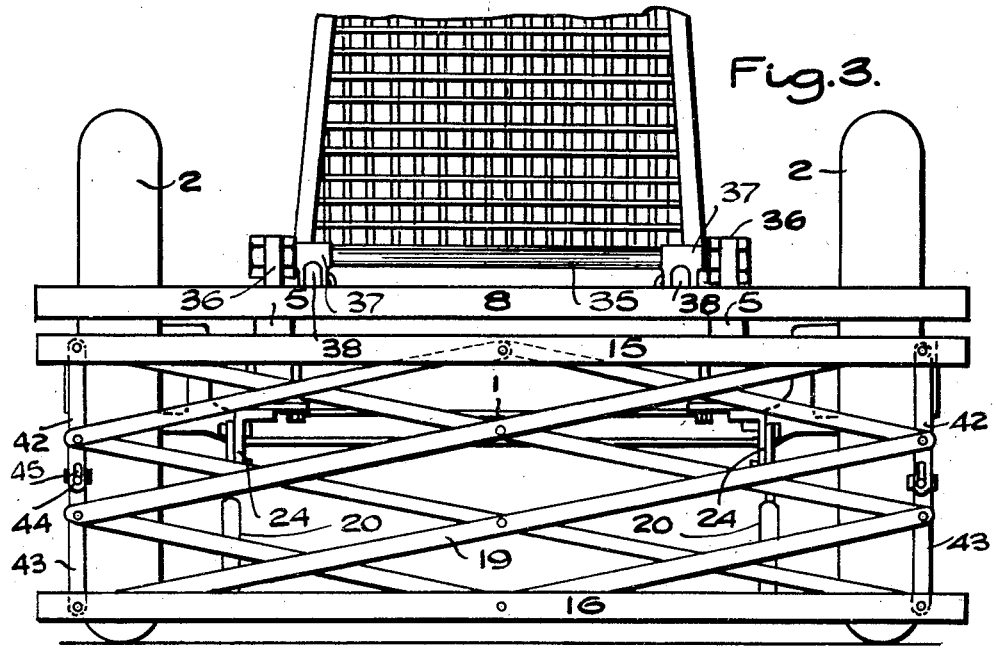

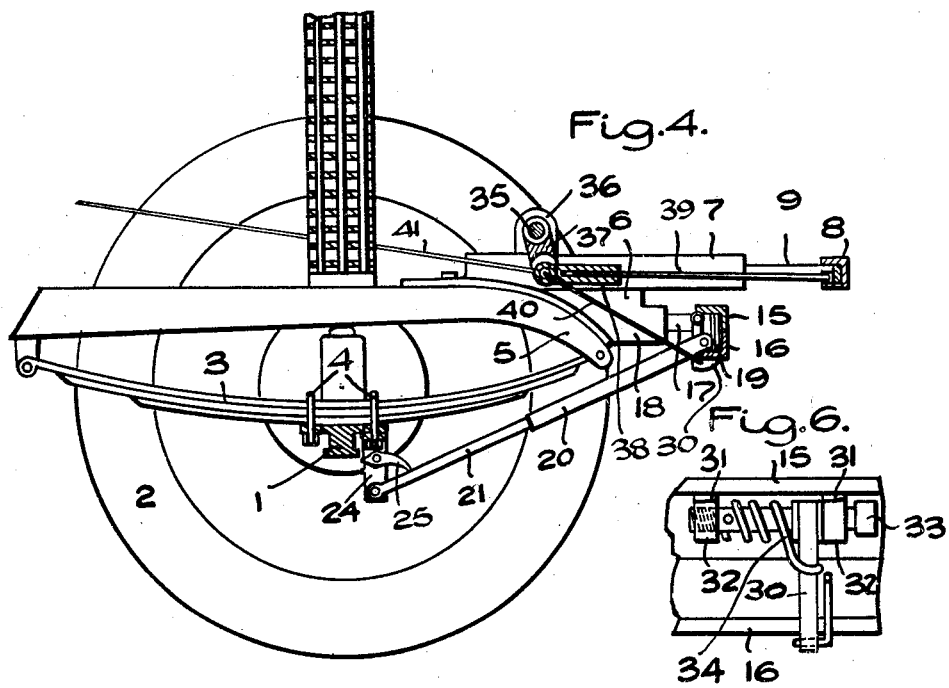
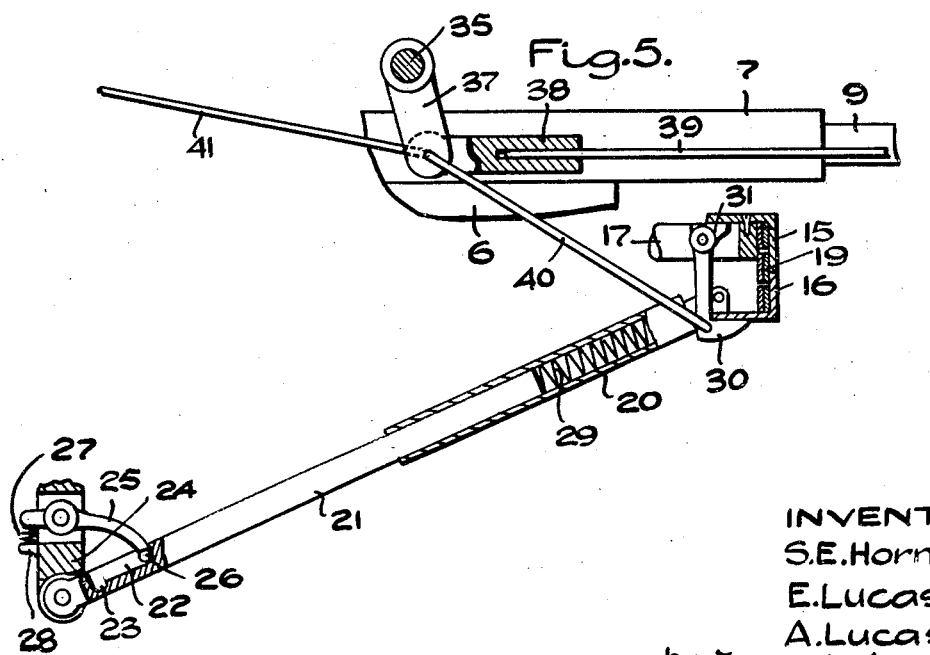

UNITED STATES PATENT OFFICE.

SAMUEL EDWIN HORNE, ERNEST LUCAS, AND ALFRED LUCAS, OF TORONTO, ONTARIO, CANADA.

AUTOMOBILE-FENDER.

1,363,738.   Specification of Letters Patent.   Patented Dec. 28, 1920.

Application filed October 11, 1920. Serial No. 416,264.

*To all whom it may concern:*

Be it known that we, SAMUEL EDWIN HORNE, ERNEST LUCAS, and ALFRED LUCAS, all subjects of the King of Great Britain, and residents of the city of Toronto, in the county of York, in the Province of Ontario, Canada, have invented certain new and useful Improvements in Automobile-Fenders, of which the following is the specification.

Our invention relates to improvements in automobile fenders and the object of the invention is to devise a fender that will automatically drop upon a person getting in the way of the car. A further object is to provide means whereby the fender can be lowered by the driver of the car independently of the automatic means. A still further object is to provide means for locking the fender in the down position. Another object is to devise means for normally protecting the fender when in the inoperative position.

Our invention consists of the parts constructed and arranged all as hereinafter more particularly described and illustrated in the accompanying drawing in which:

Figure 1 represents a plan view of the front portion of a car showing our fender applied thereto.

Fig. 2 is a front elevation of a car showing our fender in the closed or up position.

Fig. 3 is a similar view to Fig. 2 showing the fender in the down position.

Fig. 4 is a longitudinal vertical section of the front portion of a car taken through the line *a—b* Fig. 2.

Fig. 5 is an enlarged detail showing the automatic means for tripping the fender and also the means for locking the fender in the down position.

Fig. 6 is an enlarged elevational detail showing the catches for normally retaining the fender in the closed position.

Fig. 7 is a perspective detail of the alternative form of locking means for locking the fender in the down position.

Fig. 8 is a horizontal section of a portion of the means shown in Fig. 7, and

Fig. 9 is a cross section.

Like characters of reference indicate corresponding parts in the different views.

1 is the front axle of the car. 2 are the front wheels. 3 are the front springs, secured to the axle 1 by the clips 4. 5 are the front forks of the chassis frame. 6 are brackets suitably secured to the front forks 5, each of the brackets having the forwardly directed cylindrical portions 7. 8 is a bumper member suitably connected to the rearwardly extending supporting arms 9 provided with enlarged cylindrical portions 10 adapted to extend into the cylindrical members 7. Each of the cylindrical members 7 is provided with the main spiral spring 11 which constitutes a resilient connection between the bumper and the cylinder. A separating plate 12 is provided in front of each main spiral spring 11.

In front of the spring 11 a weaker spring 13 is inserted between it and the enlarged portion 10. 14 is a suitable catch extending through the cylinder 7 and adapted to engage the enlarged portion 10, said catch being normally in the disengaged position. 15 and 16 are the upper and lower fender members, the upper member 15 being suitably connected by the arms 17 to the forwardly directed bosses 18 on the brackets 6. 19 is an expansible and contractible gate pivotally connected at its upper end to the fender member 15 and at its lower end to the fender member 16, said members 15 and 16 being preferably constructed of angle iron cross section and oppositely disposed as is clearly shown in Fig. 5.

20 are tubular members pivotally connected at their forward ends to the lower fender member 16 intermediately of the length of the same. 21 are rods telescoping into the tubular members 20, each of said rods being provided with a slot 22 in the vicinity of the rear end thereof, said slot 22 having a deepened slot 23 at its rear end. The back end of the rod 21 is pivotally connected to the bracket 24 suitably secured to the axle 1, as for instance by being secured to the forward spring clip 4.

25 is a pawl pivotally connected to the bracket 24 and having a T-shaped end 26 adapted to be retained in the slot 22. A spring 27 is interposed between the other end of the pawl 25 and the lug 28 extending rearwardly from the bracket, said spring normally keeping the T-shaped head of the pawl in engagement with the bottom of the slot. 29 is a spring inserted into the tubular member 20 and bearing at its forward end against the forward end of such member and at its rear end against the forward end of the rod 21.

30 are spring held catches pivotally connected on brackets 31 secured to the lower face of the upper fender member 15, said catches adapted to engage the lower surface of the lower fender member 16, and being situated intermediately of the length of the fender member 15. 32 are bearings through which a bolt 33 extends, said bolt 33 being threaded into the left hand bearing 32 and freely extending through the right hand bearing 34 is a spiral spring wound about the bolt 33 and secured at one end thereto, the other end of the spring being suitably secured to the catch 30 intermediately of the height of the same.

By mounting the spring catches 30 in this manner it will be seen that they are spring held so as to always be in engagement with the lower fender member 16, unless displaced therefrom by the means which will hereinafter be described.

35 is a cross shaft rotatably mounted in bearings 36 and secured to the brackets, said shafts being provided with the depending bifurcated arms 37, 38 are socket members pivotally connected between the portions of the bifurcated arms 37, and 39 are rods freely extending into the socket members 38 at their rear ends and pivotally connected at their forward ends to the bumper member 8. 40 are rods pivotally connected at their forward ends to the spring catches 30 in the vicinity of their lower ends and pivotally connected at their rear ends to the bifurcated arms 37.

41 is an operating cable connected at the forward end to one of the bifurcated arms 37 and extending rearwardly to within reach of the driver of the car. 42 and 43 are upper and lower links pivotally connected together at their adjacent ends, the upper links being pivotally connected at their upper ends to the upper fender member 15 and the lower links being pivotally connected at their lower ends to the lower fender member 16. These links are adapted to support the ends of the gate when in the open position as is shown in Fig. 3.

44 is a pivot pin suitably secured to the link 43 and extending through a longitudinal slot 45 in the link 42, such pivot pin forming a connection between the two links which are slidably as well as pivotally connected together. 46 are lugs formed on the link 43 and turned at right angles thereto, said lugs adapted to engage the side walls of the link 42. The link 42 is slotted out on the face adjacent to the link 43 to permit of the lugs 46 being inserted therethrough when the gate is closed up.

48 is a pin extending through a hole 49 in the link 42 and adapted to enter a corresponding hole 50 in the link 43, said pin being normally held in place by the spring 51 secured to the link 42. The end of the pin 49 is tapered as is shown in Fig. 9 to permit it to ride over the link 43 when these links are extended into the positions shown in Fig. 7 and thus enter the hole 50.

Our device is adapted to be operated both automatically and manually and we will now describe the operation of the same. Assuming that the fender is in the position shown in Fig. 2 it will be automatically lowered by any person or any obstruction striking the bumper member 8. When this occurs the bumper member is forced back and with it the rods 39 extending into the socket members 38. These rods push back the arms 37 partially rotating the shaft 35 in the bearings 36 and consequently drawing back the rods 40 connected to the spring catches 30 and releasing said spring catches from the lower fender member 16.

The fender member will now drop automatically by gravity, opening the gate 19 into the position shown in Fig. 3.

In addition to operating automatically the device can be operated manually by the driver of the car by pulling the cable 41, which draws back the arm 37 partially rotating the shaft 35 and drawing back the other arm 37 correspondingly. When this occurs the rods 40 will be drawn back, the spring catches 30 released from the lower fender member 16 and the gate dropped in the same manner as above described.

When operating the gate manually it will be apparent that as the rods 39 are freely mounted in the socket members 38 these rods will not move, but the socket members will simply draw out a certain extent as the arms 37 are moved rearwardly.

The springs 13 in the cylinder 7 are weaker than the main springs 11 for reason that in the automatic operation of the fender caused by the person coming in contact with the bumper member 8, the resistance offered to the person hitting the car will be considerably less than if the main springs 11 were to come into play immediately the person struck the bumper.

Of course when the weaker springs 13 are fully compressed the cylindrical portions 10 will engage the separating plates 12 and thus cause the compression of the main springs 11 as will ordinarily occur in the ordinary spring type of bumper.

Catches 14 are provided so that the bumper cannot be tampered with when the car is standing in the road. As the tension of the springs 13 is necessarily light it would be a simple thing for children playing about the car to trip the fender by pushing in the bumper member 8, consequently the driver of the car locks the catches 14 before leaving the car.

When the lower fender member 16 is dropped and the gate opens the tubular members 20 and the corresponding rods 21 will be swung down into the position shown in Fig. 3. When this occurs the T-shaped head 26 of each pawl 25 will travel rearwardly along the slot 22 and when the fender is in the down position will enter the deepened slot 23, thus locking such fender in the down position. The spring 29 being interposed between the rod 21 and the tubular member 20 will give a certain amount of resiliency to the fender and gate, thus reducing the impact upon any one striking such gate. This locking mechanism has also a tendency to allow the gate to twist a certain extent should a person come into contact with the same, thus distorting the gate out of alinement and inclining it rearwardly on one side or the other. This will tend to throw the person clear of the car instead of pushing him along in front of the same.

An alternative locking mechanism is shown in Figs. 7, 8, and 9 consisting of the connected links 42 and 43. When these links are extended into the position shown in Fig. 7 the fender is automatically locked into its down position by the pins 48 entering the holes 50 in the link 43. To release the fender it is merely necessary to draw out the pins 48 from such holes 50, press the two links together until the lugs 46 register with the slots 47 and swing the links about the pivot pin 44, when such links will collapse.

The pairs of links 42 and 43 are situated immediately behind the outer ends of the gate 19 in order to support the same. In the event of the link locking device being used it will be unnecessary to use the pawls 25 but of course the rods 21 and the tubular members 20 will be retained for the purpose of resiliently supporting the gate. Conversely, if the locking pawls 25 are used it will be unnecessary to use the locking mechanism on the links 42 and 43 which will then be merely pivoted together at their adjacent ends, their free ends being pivotally connected to the upper ends of the lower fender members 15 and 16 respectively.

From the above description it will be seen that we have devised a simple and effective fender for automobiles and one that will be positive in action. In addition to being operated manually by the driver of the car it will be tripped automatically. Further the fender is so disposed behind the bumper member as to be protected from any collision.

What we claim as our invention is:

1. The combination with an automobile bumper, of a fender comprising upper and lower portions, the upper portion being fixed, an expandible and contractible gate connecting the upper portion of the fender to the lower portion, means for normally holding the lower portion of the fender in the up position with the gate collapsed, means for releasing the lower portion of the fender and resilient means for supporting the lower portion of the fender against displacement.

2. The combination with an automobile bumper, of a fender comprising upper and lower portions, the upper portion being fixed, an expandible and contractible gate connecting the upper portion of the fender to the lower portion, means for normally holding the lower portion of the fender in the up position with the gate collapsed, means for releasing the lower portion of the fender, resilient means for supporting the lower portion of the fender against displacement and means for locking the fender in the down position.

3. The combination with an automobile bumper, of a fender comprising upper and lower portions, the upper portion being fixed, an expandible and contractible gate connecting the upper portion of the fender to the lower portion, means for normally holding the lower portion of the fender in the up position with the gate collapsed, means for automatically releasing the lower portion of the fender, said means controlled by the rearward movement of the bumper and resilient means for locking the fender in the down position.

4. The combination with an automobile bumper, of a fender comprising upper and lower portions, the upper portion being fixed, an expandible and contractible gate connecting the upper portion of the fender to the lower portion, means for normally holding the lower portion of the fender in the up position with the gate collapsed, means for automatically releasing the lower portion of the fender, said means controlled by the rearward movement of the bumper, manually controlled means for independently releasing the lower portion of the fender independently of the bumper actuating means, and resilient means for locking the fender in the down position.

5. The combination with the front of an automobile chassis frame, of a bumper resiliently secured thereto, a fender comprising upper and lower portions, the upper portion being secured to the chassis frame, an expandible and contractible fender gate pivotally connected at its upper end to the upper portion of the fender and pivotally connected at its lower end to the lower portion of the fender, spring held catches pivotally mounted on the upper portion of the fender and normally engaging the lower portion of the fender, a cross shaft rotatably mounted on the chassis frame, depending arms secured thereto, rods pivotally connected at their forward ends to the bumper and pivotally connected at their rear ends to the depending arms, and rods pivotally connected to the depending arms at their rear ends and to the spring held catches at their forward ends, and means connected to one of the depending arms for actuating the same.

6. The combination with the front of an automobile chassis frame, of a bumper resiliently secured thereto, a fender comprising upper and lower portions, the upper portion being secured to the chassis frame, an expandible and contractible fender gate pivotally connected at its upper end to the upper portion of the fender and pivotally connected at its lower end to the lower portion of the fender, spring held catches pivotally mounted on the upper portion of the fender and normally engaging the lower portion of the fender, a cross shaft rotatably mounted on the chassis frame, depending arms secured thereto, rods pivotally connected at their forward ends to the bumper and pivotally connected at their rear ends to the depending arms, and rods pivotally connected to the depending arms at their rear ends and to the spring held catches at their forward ends, and a cable connected at its forward end to one of the depending arms.

7. The combination with the front of an automobile chassis frame, of a bumper resiliently secured thereto, a fender comprising upper and lower portions, the upper portion being secured to the chassis frame, an expandible and contractible fender gate pivotally connected at its upper end to the upper portion of the fender and pivotally connected at its lower end to the lower portion of the fender, spring held catches pivotally mounted on the upper portion of the fender and normally engaging the lower portion of the fender, a cross shaft rotatably mounted on the chassis frame, depending arms secured thereto, rods pivotally connected at their forward ends to the bumper, socket members pivotally connected to the depending arms, the rear ends of the rods extending into the socket members and adapted to engage the same upon the rearward movement of the bumper, and rods pivotally connected to the depending arms at their rear ends and to the spring held catches at their forward ends, and a cable connected at its forward end to one of the depending arms.

8. The combination with the front of an automobile chassis frame, of a bumper resiliently secured thereto, a fender comprising upper and lower portions, the upper portion being secured to the chassis frame, an expandible and contractible fender gate pivotally connected at its upper end to the upper portion of the fender and pivotally connected at its lower end to the lower portion of the fender, spring held catches pivotally mounted on the upper portion of the fender and normally engaging the lower portion of the fender, a cross shaft rotatably mounted on the chassis frame, depending arms secured thereto, rods pivotally connected at their forward ends to the bumper and pivotally connected at their rear ends to the depending arms, and rods pivotally connected to the depending arms at their rear ends and to the spring held catches at their forward ends, a cable connected at its forward end to one of the depending arms, and means for automatically locking the fender in the down position.

9. The combination with the front of an automobile chassis frame, of a bumper resiliently secured thereto, a fender comprising upper and lower portions, the upper portion being secured to the chassis frame, an expandible and contractible fender gate pivotally connected at its upper end to the upper portion of the fender and pivotally connected at its lower end to the lower portion of the fender, spring held catches pivotally mounted on the upper portion of the fender and normally engaging the lower portion of the fender, a cross shaft rotatably mounted on the chassis frame, depending arms secured thereto, rods pivotally connected at their forward ends to the bumper and pivotally connected at their rear ends to the depending arms, and rods pivotally connected to the depending arms at their rear ends and to the spring held catches at their forward ends, a cable connected at its forward end to one of the depending arms, and resilient means for automatically locking the fender in the down position.

10. The combination with the front of an automobile chassis frame and the front axle, of a bumper resiliently secured thereto, a fender comprising upper and lower portions, the upper portion being secured to the chassis frame, an expandible and contractible fender gate pivotally connected at its upper end to the upper portion of the fender and pivotally connected at its lower end to the lower portion of the fender, spring held catches pivotally mounted on the upper portion of the fender and normally engaging the lower portion of the fender, a cross shaft rotatably mounted on the chassis frame, depending arms secured thereto, rods pivotally connected at their forward ends to the bumper and pivotally connected at their rear ends to the depending arms, and rods pivotally connected to the depending arms at their rear ends and to the spring held catches at their forward ends, a cable connected at its forward end to one of the depending arms, rods pivotally connected at their rear ends to the front axle, tubular members pivotally connected at their forward ends to the lower portion of the fender, the forward ends of the said rods being inserted into the tubular members, springs interposed between the forward ends of the rods and the forward end of the tubular member in the interior of the same, and pivotally mounted locking pawls sliding in slots in the said rods and adapted to engage a depression therein for locking such rods in the down position.

11. The combination with the front of an automobile chassis frame, of forwardly directed tubular brackets secured to the chassis frame, relatively strong springs inserted therein, parting plates in front of the springs, relatively weaker springs in front of the parting plates, slidable plungers in front of the relatively weaker springs, bumpers, rods connecting the bumpers with the plungers, a fender comprising upper and lower portions, the upper portion being suitably secured to the chassis frame, an expandible and contractible gate pivotally connected at its upper end to the upper fender portion and pivotally connected at its lower end to the lower fender portion, means for normally retaining the lower portion of the fender and the fender gate in the inoperative or up position, and means controlled by the backward movement of the bumper for releasing the lower portion of the fender and the fender gate.

SAMUEL EDWIN HORNE.
ERNEST LUCAS.
ALFRED LUCAS.